(12) United States Patent
Edwards et al.

(10) Patent No.: US 9,620,253 B2
(45) Date of Patent: Apr. 11, 2017

(54) RISER CONE APPARATUS TO PROVIDE COMPLIANCE BETWEEN REACTOR COMPONENTS AND MINIMIZE REACTOR COOLANT BYPASS FLOW

(71) Applicant: Babcock & Wilcox mPower, Inc., Charlotte, NC (US)

(72) Inventors: Tyler A Edwards, Lynchburg, VA (US); Scott J Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 770 days.

(21) Appl. No.: 13/859,768

(22) Filed: Apr. 10, 2013

(65) Prior Publication Data
US 2013/0301783 A1    Nov. 14, 2013

Related U.S. Application Data

(60) Provisional application No. 61/625,764, filed on Apr. 18, 2012, provisional application No. 61/625,399, (Continued)

(51) Int. Cl.
*G21C 13/02*    (2006.01)
*G21C 13/04*    (2006.01)
(Continued)

(52) U.S. Cl.
CPC .............. *G21C 13/02* (2013.01); *G21C 1/322* (2013.01); *G21C 13/028* (2013.01); *G21C 13/04* (2013.01); *G21C 15/00* (2013.01); *Y02E 30/40* (2013.01)

(58) Field of Classification Search
CPC ...... G21C 1/322; G21C 13/04; G21C 13/028; G21C 1/32
(Continued)

(56) References Cited

U.S. PATENT DOCUMENTS 4,072,563 A * 2/1978 McDonald ............. G21C 1/322
                                                      376/406
4,885,127 A   12/1989 Yokoyama
(Continued)

FOREIGN PATENT DOCUMENTS

JP    H0643275      2/1994
WO    2013058847    4/2013

OTHER PUBLICATIONS

Extended European Search Report dated Nov. 10, 2015 for European Application No. 13788268.4.
(Continued)

*Primary Examiner* — Jack W Keith
*Assistant Examiner* — Daniel Wasil
(74) *Attorney, Agent, or Firm* — Nelson Mullins Riley & Scarborough, LLP (57) ABSTRACT

A riser cone has a lower end sized to engage a cylindrical lower riser section of a nuclear reactor and an upper end sized to engage a cylindrical upper riser section of the nuclear reactor. The riser cone defines a compression sealing ring that is compressed between the lower riser section and the upper riser section in the assembled nuclear reactor. In some embodiments the riser cone comprises: a lower element defining the lower end of the riser cone; an upper element defining the upper end of the riser cone; and a compliance spring compressed between the lower element and the upper element. In some embodiments the riser cone comprises a frustoconical compression sealing ring accommodating a reduced diameter of the upper riser section as compared with the diameter of the lower riser section.

5 Claims, 11 Drawing Sheets

Related U.S. Application Data filed on Apr. 17, 2012, provisional application No. 61/625,290, filed on Apr. 17, 2012.

(51) Int. Cl.
 *G21C 1/32* (2006.01)
 *G21C 13/028* (2006.01)
 *G21C 15/00* (2006.01)

(58) Field of Classification Search
 USPC .................................. 376/347, 395, 399, 406
 See application file for complete search history.

(56) References Cited

U.S. PATENT DOCUMENTS

| | | | |
|---|---|---|---|
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,158,740 A | 10/1992 | Boatwright | |
| 5,207,980 A | 5/1993 | Gilmore et al. | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,328,667 A | 7/1994 | Johnson | |
| 5,367,549 A | 11/1994 | Hatfield | |
| 5,436,945 A | 7/1995 | Weisel et al. | |
| 5,513,234 A | 4/1996 | Rottenberg | |
| 5,640,434 A | 6/1997 | Rottenberg | |
| 6,055,288 A | 4/2000 | Schwirian | |
| 6,088,420 A | 7/2000 | Yokoyama et al. | |
| 6,721,381 B2 | 4/2004 | Martin et al. | |
| 6,810,099 B2 | 10/2004 | Nakamaru et al. | |
| 6,895,067 B2 | 5/2005 | Borum et al. | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,574,337 B2 | 8/2009 | Kropaczek et al. | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0207672 A1 | 9/2006 | Henricksson et al. | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2010/0316181 A1 | 12/2010 | Thome et al. | |
| 2012/0057992 A1 | 3/2012 | Sprague et al. | |
| 2012/0076254 A1 | 3/2012 | Malloy et al. | |
| 2012/0294410 A1* | 11/2012 | Steinmoeller | G21C 13/02 376/399 |
| 2013/0028367 A1* | 1/2013 | Shargots | G21C 1/32 376/372 |
| 2013/0121453 A1* | 5/2013 | Shargots | G21C 1/322 376/399 |

OTHER PUBLICATIONS

International Search Report and Written Opinion for PCT/US2013/036060 dated Sep. 30, 2013.

Office Action dated Mar. 28, 2016 for Chinese Application No. 201380031911.4.

* cited by examiner

RISER CONE APPARATUS TO PROVIDE COMPLIANCE BETWEEN REACTOR COMPONENTS AND MINIMIZE REACTOR COOLANT BYPASS FLOW

This application claims the benefit of U.S. Provisional Application No. 61/625,764 filed Apr. 18, 2012 and titled "UPPER INTERNALS". U.S. Provisional Application No. 61/625,764 filed Apr. 18, 2012 titled "UPPER INTERNALS" is hereby incorporated by reference in its entirety into the specification of this application.

This application claims the benefit of U.S. Provisional Application No. 61/625,399 filed Apr. 17, 2012 and titled "RISER TRANSITION". U.S. Provisional Application No. 61/625,399 filed Apr. 17, 2012 titled "RISER TRANSITION" is hereby incorporated by reference in its entirety into the specification of this application.

This application claims the benefit of U.S. Provisional Application No. 61/625,290 filed Apr. 17, 2012 and titled "RISER CONE APPARATUS TO PROVIDE COMPLIANCE BETWEEN REACTOR COMPONENTS AND MINIMIZE REACTOR COOLANT BIPASS FLOW". U.S. Provisional Application No. 61/625,290 filed Apr. 17, 2012 titled "RISER CONE APPARATUS TO PROVIDE COMPLIANCE BETWEEN REACTOR COMPONENTS AND MINIMIZE REACTOR COOLANT BIPASS FLOW" is hereby incorporated by reference in its entirety into the specification of this application.

BACKGROUND

The following relates to the nuclear reactor arts and related arts.

There is increasing interest in compact reactor designs. Some compact reactor designs are disclosed, for example, in Thome et al., "Integral Helical-Coil Pressurized Water Nuclear Reactor", U.S. Pub. No. 2010/0316181 A1 published Dec. 16, 2010 which is incorporated by reference in its entirety; Malloy et al., "Compact Nuclear Reactor", U.S. Pub. No. 2012/0076254 A1 published Mar. 29, 2012 which is incorporated by reference in its entirety. These compact reactors are of the pressurized water reactor (PWR) type in which a nuclear reactor core is immersed in primary coolant water at or near the bottom of a pressure vessel, and the primary coolant is suitably light water maintained in a subcooled liquid phase in a cylindrical pressure vessel that is mounted generally upright (that is, with its cylinder axis oriented vertically). A hollow cylindrical central riser is disposed concentrically inside the pressure vessel and (together with the core basket or shroud) defines a primary coolant circuit in which coolant flows upward through the reactor core and central riser, discharges from the top of the central riser, and reverses direction to flow downward back to below the reactor core through a downcomer annulus defined between the pressure vessel and the central riser. The nuclear core is built up from multiple fuel assemblies each comprising a bundle of fuel rods containing fissile material (typically $^{235}$U). The compact reactors disclosed in Thome et al. and Malloy et al. are integral PWR designs in which the steam generator(s) is disposed inside the pressure vessel, namely in the downcomer annulus in these designs. Integral PWR designs eliminate the external primary coolant loop carrying radioactive primary coolant.

In a typical PWR design, upper internals located above the reactor core include control rod assemblies with neutron-absorbing control rods that are inserted into/raised out of the reactor core by control rod drive mechanisms (CRDMs). These upper internals include control rod assemblies (CRAs) comprising neutron-absorbing control rods yoked together by a spider. Conventionally, the CRDMs employ motors mounted on tubular pressure boundary extensions extending above the pressure vessel, which are connected with the CRAs via suitable connecting rods. For compact reactor designs, it is contemplated to replace the external CRDM motors with wholly internal CRDM motors. See Stambaugh et al., "Control Rod Drive Mechanism for Nuclear Reactor", U.S. Pub. No. 2010/0316177 A1 published Dec. 16, 2010 which is incorporated herein by reference in its entirety; and DeSantis, "Control Rod Drive Mechanism for Nuclear Reactor", U.S. Pub. No. 2011/0222640 A1 published Sep. 15, 2011 which is incorporated herein by reference in its entirety.

Disclosed herein are improvements, including, but not limited to, a riser cone apparatus to provide compliance between reactor components and minimize reactor coolant bypass flow, that provide various benefits that will become apparent to the skilled artisan upon reading the following.

BRIEF SUMMARY

In one disclosed aspect, a nuclear reactor comprises: a cylindrical pressure vessel including an upper vessel section and a lower vessel section; a nuclear reactor core comprising fissile material disposed in the cylindrical pressure vessel immersed in primary coolant water; a cylindrical central riser disposed in the cylindrical pressure vessel above the nuclear reactor core, the cylindrical central riser including an upper riser section disposed in the upper pressure vessel section and a lower riser section disposed in the lower pressure vessel section; and a riser cone disposed between the upper riser section and the lower riser section, the riser cone providing sealing between the upper and lower riser sections. In some embodiments the lower riser section comprises a core basket or shroud surrounding the nuclear reactor core, and may further comprise a riser transition weldment disposed on the core basket or shroud, the riser transition weldment including interface features engaging a lower end of the riser cone. In some embodiments the upper riser section has a smaller diameter than the lower riser section and the riser cone comprises a frustoconical compression sealing ring accommodating the difference in diameters. For example, the riser cone may comprise: a frustoconical body having a lower end engaging the lower riser section; a sealing ring engaging the upper riser section; and a spring compressed between the sealing ring and an upper end of the frustoconical body.

In another disclosed aspect, an apparatus comprises a riser cone having a lower end sized to engage a cylindrical lower riser section of a nuclear reactor and an upper end sized to engage a cylindrical upper riser section of the nuclear reactor. The riser cone defines a compression sealing ring that is compressed between the lower riser section and the upper riser section in the assembled nuclear reactor. In some embodiments the riser cone comprises: a lower element defining the lower end of the riser cone; an upper element defining the upper end of the riser cone; and a compliance spring compressed between the lower element and the upper element. In some embodiments the riser cone comprises a frustoconical compression sealing ring accommodating a reduced diameter of the upper riser section as compared with the diameter of the lower riser section.

In another disclosed aspect, a riser is disclosed for defining a coolant flow path in a nuclear reactor including a hot leg flowing inside the riser and a cold leg flowing outside the riser, the riser comprising a hollow cylindrical upper riser section having a smaller diameter; a hollow cylindrical lower riser section having a diameter that is larger than the smaller diameter of the hollow cylindrical upper riser section; and a riser cone compressed between a lower end of the hollow cylindrical upper riser section and an upper end of the hollow cylindrical lower riser section, the riser cone having a lower end mating with the upper end of the hollow cylindrical lower riser section and an upper end mating with the lower end of the hollow cylindrical upper riser section, the riser cone providing sealing between the lower end of the hollow cylindrical upper riser section and the upper end of the hollow cylindrical lower riser section.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
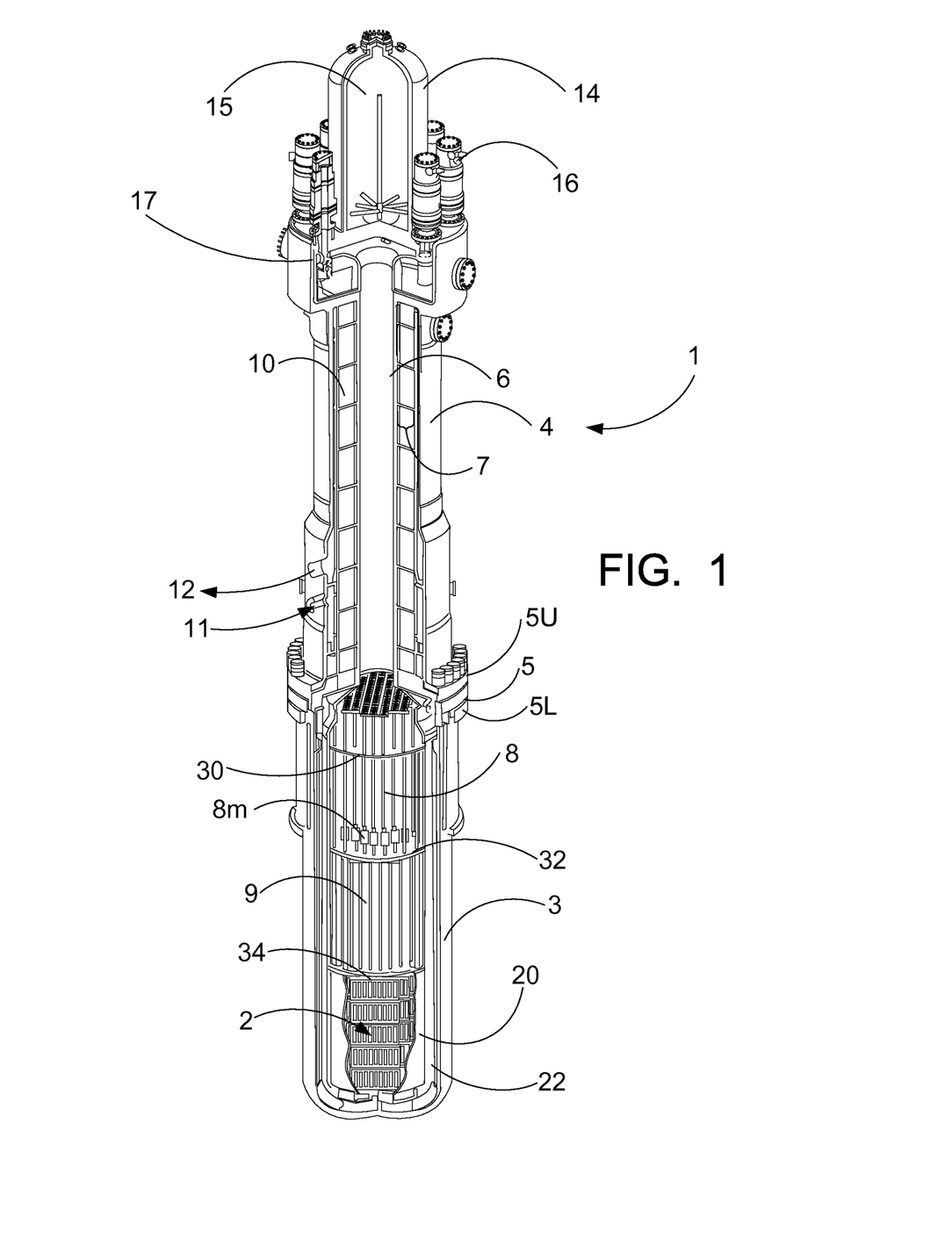
FIG. 1 illustrates a compact nuclear reactor in partial cutaway perspective view revealing selected internal components.

With reference to FIG. 1, a small modular reactor (SMR) 1 of the integral pressurized water reactor (PWR) variety is shown in partial cutaway to reveal selected internal components. The illustrative PWR 1 includes a nuclear reactor core 2 disposed in a pressure vessel comprising a lower vessel portion 3 and an upper vessel portion 4. The lower and upper vessel portions 3, 4 are connected by a mid-flange 5. Specifically, a lower flange 5L at the open top of the lower vessel portion 3 connects with the bottom of the mid-flange 5, and an upper flange 5U at the open bottom of the upper vessel portion 4 connects with the top of the mid-flange 5.

The reactor core 2 is disposed inside and at or near the bottom of the lower vessel portion 3, and comprises a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 with internal motors 8m immersed in primary coolant that control insertion of control rods to control reactivity. Guide frames 9 guide the translating control rod assembly (e.g., each including a set of control rods comprising neutron absorbing material yoked together by a spider and connected via a connecting rod with the CRDM). The illustrative PWR 1 employs one or more internal steam generators 10 located inside the pressure vessel and secured to the upper vessel portion 4, but embodiments with the steam generators located outside the pressure vessel (i.e., a PWR with external steam generators) are also contemplated. The illustrative steam generator 10 is of the once-through straight-tube type with an internal economizer, and are fed by a feedwater inlet 11 and deliver steam to a steam outlet 12. See Malloy et al., U.S. Pub. No. 2012/0076254 A1 published Mar. 29, 2012 which is incorporated by reference in its entirety. The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs) comprising in the illustrative example external RCP motors 16 driving an impeller located in a RCP casing 17 disposed inside the pressure vessel.

Figures 2, 3:
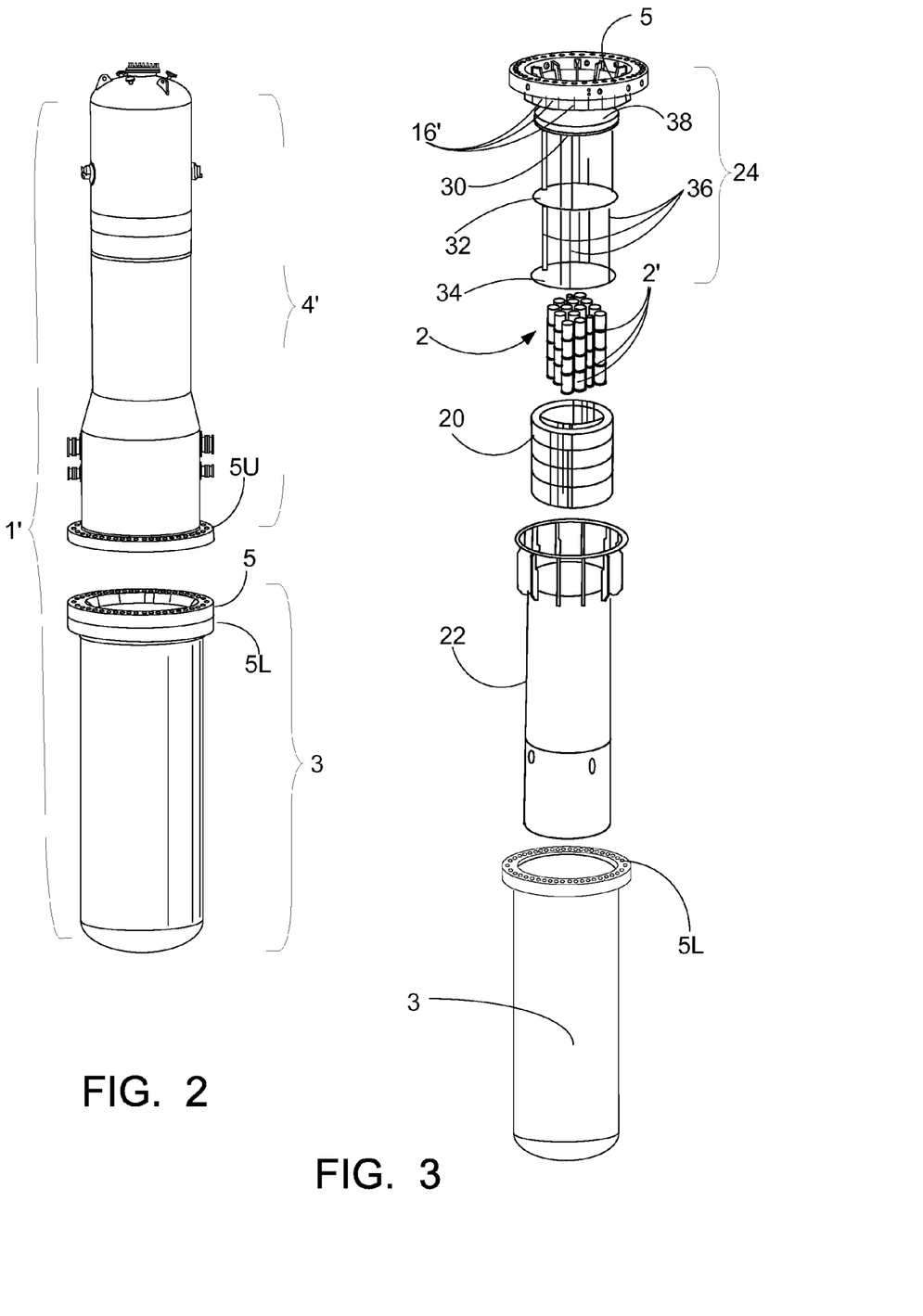
FIG. 2 illustrates a variant compact nuclear reactor in perspective view with the upper vessel lifted off.
FIG. 3 shows an exploded perspective view of the variant compact nuclear reactor of FIG. 2 showing principle internal components.

With reference to FIGS. 2 and 3, a variant PWR design 1' is shown, which differs from the PWR 1 of FIG. 1 by having a differently shaped upper vessel section 4' and internal RCPs 16' in place of the external pumps 16, 17 of the PWR 1. FIG. 2 shows the pressure vessel with the upper vessel section 4' lifted off, as is done during refueling. The mid-flange 5 remains disposed on the lower flange 5L of the lower vessel 3. FIG. 3 shows an exploded view of the lower vessel section 3 and principle components contained therein, including: the nuclear reactor core 2 comprising fuel assemblies 2' contained in a core former 20 disposed in a core basket 22.

Figures 4, 5:
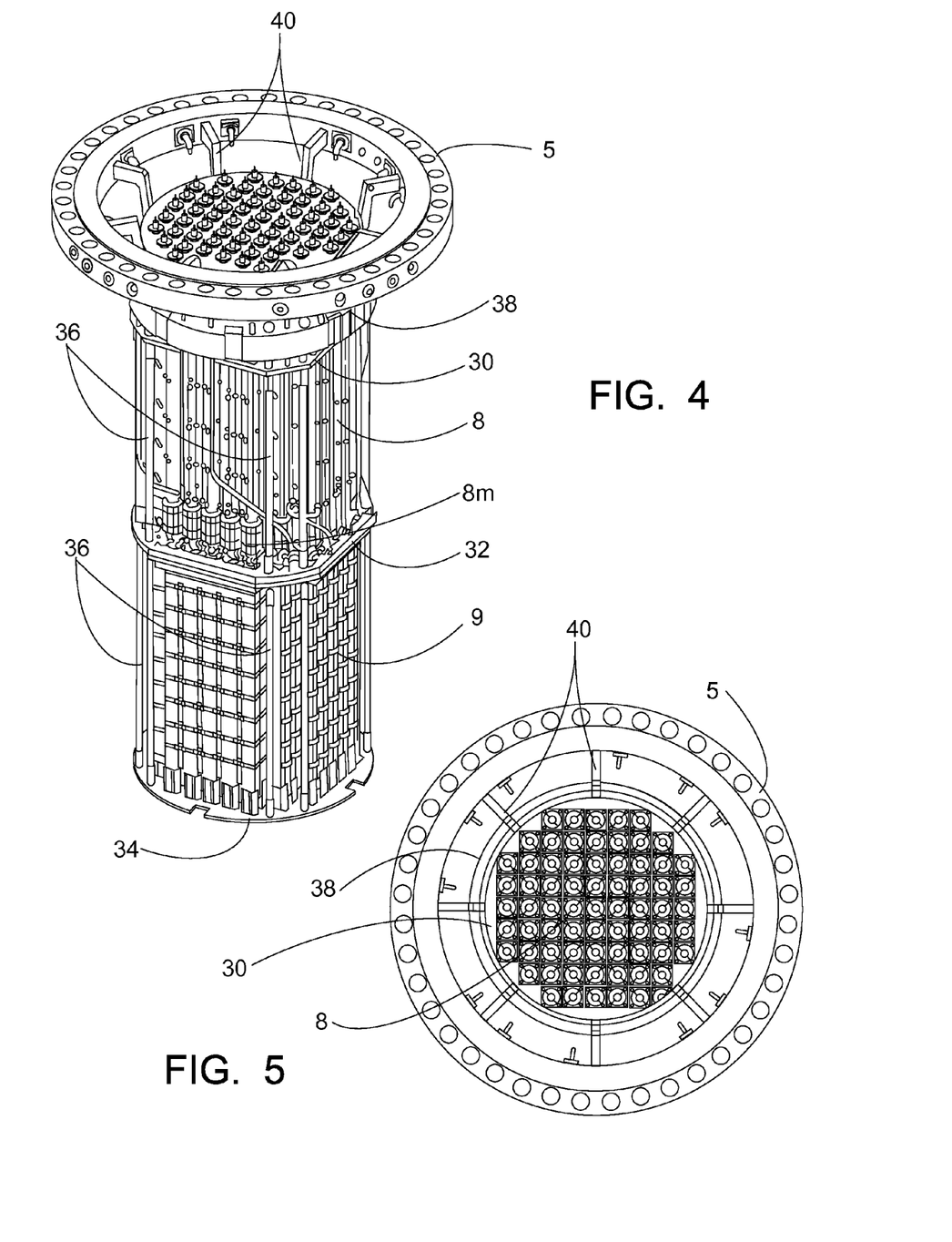
FIGS. 4 and 5 shows perspective and top views, respectively, of an illustrative embodiment of the suspended upper internals.

With continuing reference to FIGS. 1 and 3, and with further reference to FIGS. 4 and 5, above the reactor core assembly 2, 20, 22 are the upper internals which include a suspended support assembly 24 comprising an upper hanger plate 30, a mid-hanger plate 32, and a lower hanger plate 34 suspended by tie rods 36 from the mid-flange 5. More particularly, in the illustrative embodiment the upper ends of the tie rods 36 are secured to a riser transition section 38 that is in turn secured with the mid-flange 5. The central riser 6 disposed in the upper vessel section 4, 4' (shown only in FIG. 1) is connected with the core basket 22 in the lower vessel section 3 by the riser transition section 38 and riser cone 70 to form a continuous hollow cylindrical flow separator between the columnar hot leg of the primary coolant path flowing upward and the cold leg that flows downward through the downcomer annulus surrounding the hot leg. The suspended support assembly 24 comprising hanger plates 30, 32, 34 interconnected by tie rods 36 provides the structural support for the CRDMs 8 and the guide frames 9 (note the CRDMs 8 and guide frames 9 are omitted in FIG. 3). The CRDMs 8 are disposed between the upper hanger plate 30 and the mid-hanger plate 32, and are either (1) top-supported in a hanging fashion from the upper hanger plate or (2) bottom-supported on the mid-hanger plate 32 (as in the illustrative embodiments described herein). Lateral support for the CRDMs 8 is provided by both plates 30, 32. (Note that in the illustrative embodiment, the CRDMs 8 actually pass through openings of the upper hanger plate 30 so that the tops of the CRDMs 8 actually extend above the upper hanger plate 30, as best seen in FIG. 1). The guide frames 9 are disposed between the mid-hanger plate 32 and the lower hanger plate 34, and are likewise either (1) top-supported in a hanging fashion from the mid-hanger plate 32 (as in the illustrative embodiments described herein) or (2) bottom-supported on the lower hanger plate. Lateral support for the guide frames 9 is provided by both plates 32, 34.

One of the hanger plates, namely the mid-hanger plate 32 in the illustrative embodiments, also includes or supports a distribution plate that includes mineral insulated cabling (MI cables) for delivering electrical power to the CRDM motors 8M and, in some embodiments, hydraulic lines for delivering hydraulic power to scram latches of the CRDMs 8. In the embodiment of FIGS. 2 and 3 (and as seen in FIG. 3), the internal RCPs 16' are also integrated into the upper internals assembly 24, for example on an annular pump plate providing both separation between the suction (above) and discharge (below) sides of the RCPs 16' and also mounting supports for the RCPs 16'.

The disclosed upper internals have numerous advantages. The suspension frame 24 hanging from the mid-flange 5 is a self-contained structure that can be lifted out of the lower vessel section 3 as a unit during refueling. Therefore, the complex assembly of CRDMs 8, guide frames 9, and ancillary MI cabling (and optional hydraulic cabling) does not need to be disassembled during reactor refueling. Moreover, by lifting the assembly 5, 24, 8, 9 out of the lower vessel 3 as a unit (e.g. using a crane) and moving it to a suitable work stand, maintenance can be performed on the components 5, 24, 8, 9 simultaneously with the refueling, thus enhancing efficiency and speed of the refueling. The tensile forces in the tie rods 36 naturally tend to laterally align the hanger plates 30, 32, 34 and thus the mounted CRDMs 8 and guide frames 9.

The upper internals are thus a removable internal structure that is removed as a unit for reactor refueling. The upper internals basket (i.e., the suspension frame 24) is advantageously flexible to allow for movement during fit-up when lowering the upper internals into position within the reactor. Toward this end, the horizontal plates 30, 32, 34 are positioned at varying elevations and are connected to each other, and the remainder of the upper internals, via the tie rods 36. The design of the illustrative upper internals basket 24 is such that the control rod guide frames 9 are hung from the mid-hanger plate 32 (although in an alternative embodiment the guide frames are bottom-supported by the lower hanger plate). In the top-supported hanging arrangement, the guide frames 9 are laterally supported at the bottom by the lower hanger plate 34. The upper internals are aligned with the core former 20 and/or core basket 22 to ensure proper fit-up of the fuel to guide frame interface. This alignment is achieved by keying features of the lower hanger plate 34.

The illustrated upper internals are merely illustrative examples, and numerous variants are contemplated. For example, the suspended frame of the upper internals can include more than three plates, e.g. the power distribution plate could be a separate fourth plate. In another variant, the mid-hanger plate 32 could be separated into two separate hanger plates—an upper mid-hanger plate bottom-supporting the CRDMs, and a lower mid-hanger plate from which the guide frames are suspended. In such a case, the two mid-hanger plates would need to be aligned by suitable alignment features to ensure relative alignment between the CRDMs and the guide frames.

Figure 6:
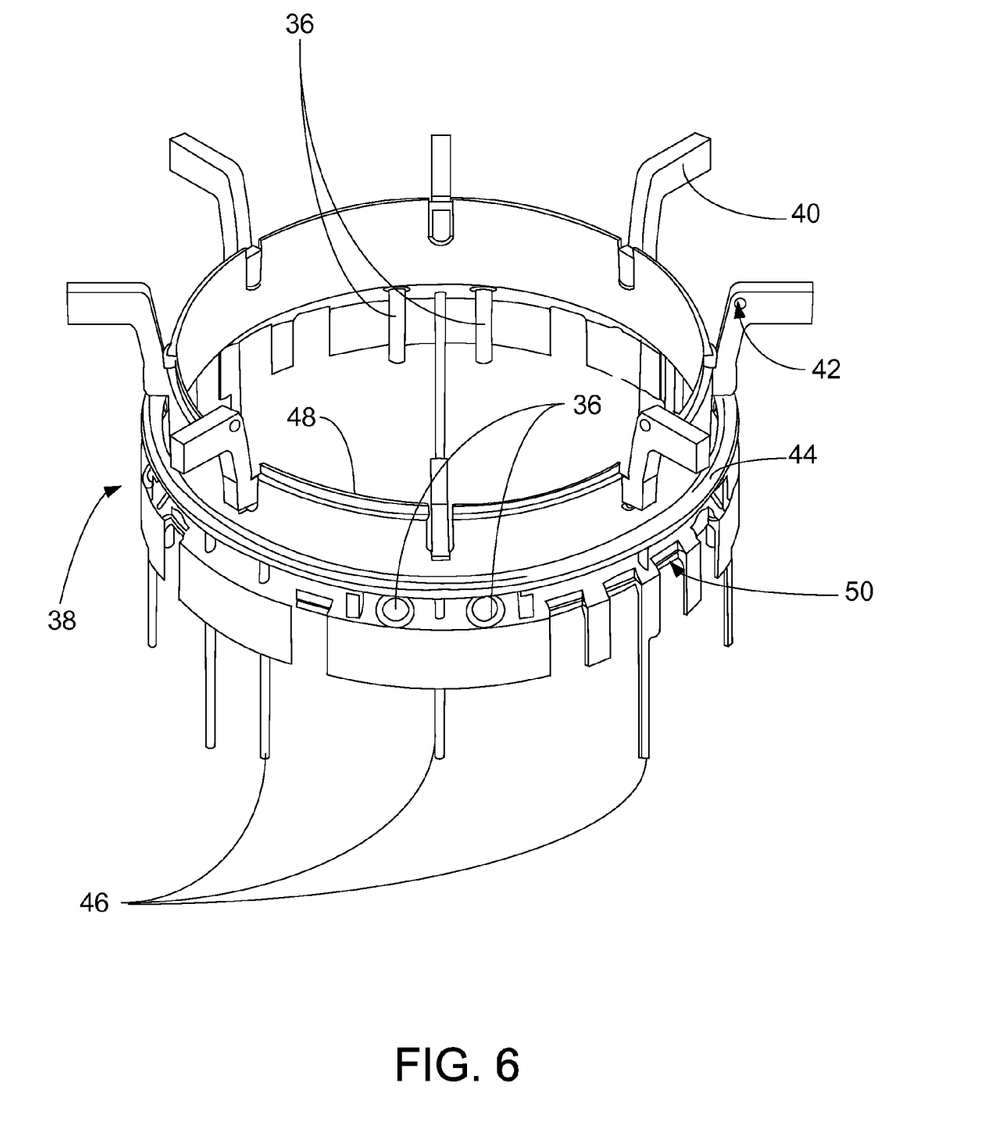
FIG. 6 shows a perspective view of the riser transition section from which the upper internals are suspended.

With reference to FIG. 6, the riser transition 38 is shown in perspective view. The riser transition assembly 38 performs several functions. The riser transition 38 provides load transfer from the tie rods 36 of the upper internals basket 24 to the mid-flange 5 of the reactor pressure vessel. Toward this end, the riser transition 38 includes gussets 40 by which the riser transition 38 is welded to the mid-flange 5. (See also FIGS. 4 and 5 showing the riser transition 38 with gussets 40 welded to the mid-flange 5). One or more of these gussets 40 may include a shop lifting lug 42 or other fastening point to facilitate transport, for example when the upper internals are lifted out during refueling. The load transfer from the tie rods 36 to the mid-flange 5 is mostly vertical loading due to the overall weight of the upper internals. However, there is also some radial differential of thermal expansion between the riser transition gussets 40 and the mid-flange 5, and the riser transition 38 has to also absorb these thermal loads. As already mentioned, the riser transition 38 also acts (in conjunction with the central riser 6 and core basket 22) as the flow divider between the hot leg and cold leg of the primary coolant loop. Still further, the riser transition 38 also houses or includes an annular hydraulic collection header 44 for supplying hydraulic power via vertical hydraulic lines 46 to the CRDMs (in the case of embodiments employing hydraulically driven scram mechanisms). The riser transition 38 also has an annular interface feature 48 for fit-up with a riser cone (see, e.g. FIG. 8) or other connection with the central riser 6, and feature cuts 50 to allow the passing of the CRDM electrical MI cable.

With brief returning reference to FIGS. 4 and 5, the gussets 40 are suitably welded to the mid-flange 5 at one end and welded to the main body portion of the riser transition assembly 38 at the other end. The riser transition 38 is suitably made of 304L steel, in some embodiments, e.g. by machining from a ring forging.

Figure 7:
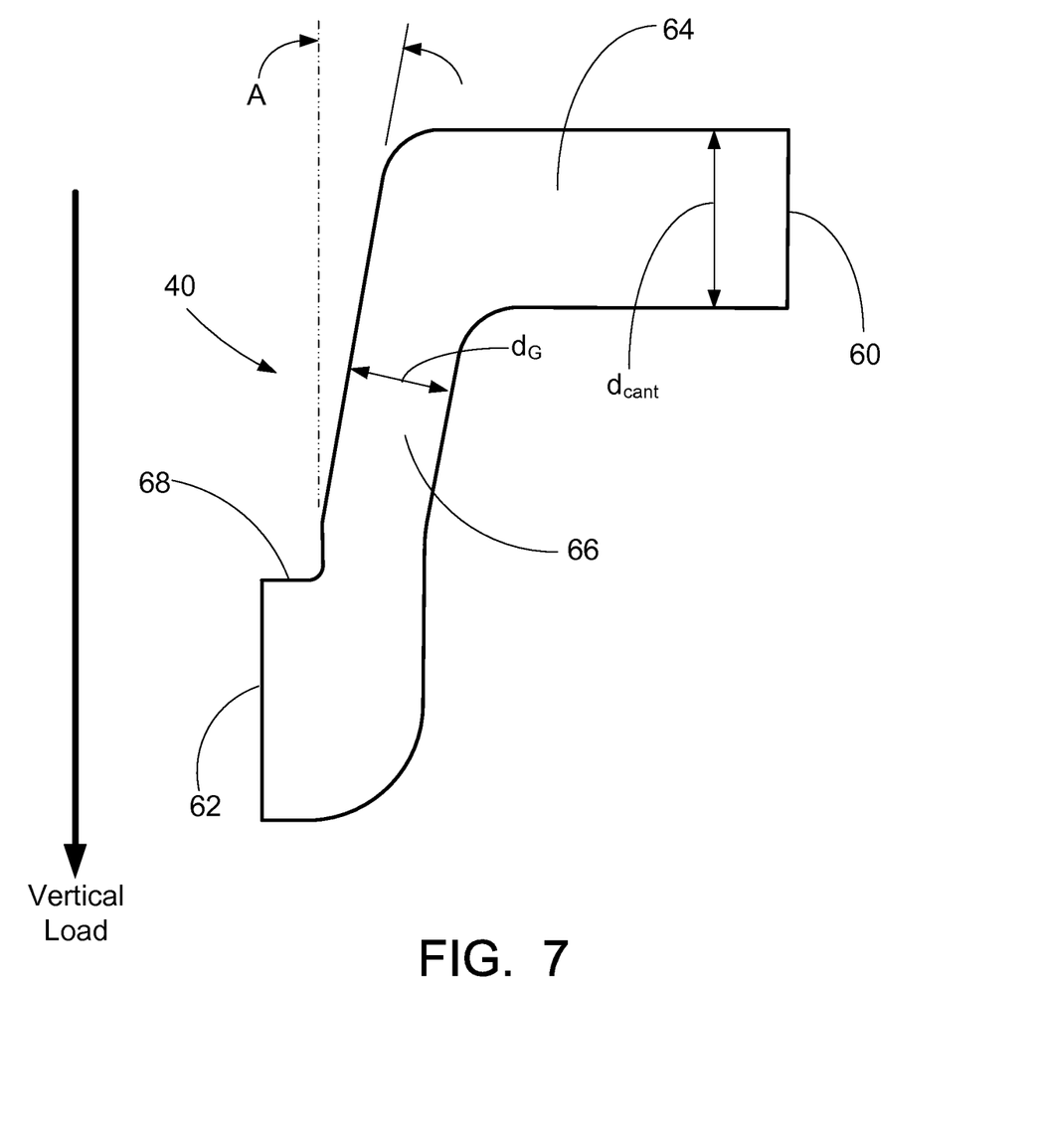
FIG. 7 shows a diagrammatic side view of one of the gussets of the riser transition section shown in FIG. 6.

With reference to FIG. 7, an illustrative gusset 40 is shown, having a first end 60 that is welded to the mid-flange 5 and a second end 62 that is welded to the riser transition 38 as already described. The gusset 40 includes horizontal cantilevered portion 64, and a tensile-strained portion 66 that angles generally downward, but optionally with an angle A indicated in FIG. 7. The horizontal cantilevered portion 64 has a thickness $d_{cant}$ that is relatively greater than a thickness $d_G$ of the tensile-strained portion 66. The thicker cantilevered portion 64 handles the vertical loading component, while the tensile-strained portion 66 allows the gusset 40 to deflect in the lateral direction to absorb lateral loading due to thermal expansion.

The coupling of the riser transition weldment 38 to the hollow cylindrical central riser 6 in the upper vessel section or portion 4 can be accomplished in various ways. In one approach, the central riser 6 is directly coupled with the riser transition weldment 38. However, in this "direct connect" approach requires precise alignment between the two components 6, 38, which may be difficult to achieve in the field, and moreover the alignment may be adversely affected by thermal expansion as the reactor is raised to its operational temperature.

A further difficulty may arise in embodiments such as those of FIGS. 1 and 3 in which an internal steam generator 10 is located in the downcomer annulus 7 defined between the central riser 6 and the upper vessel section 4. In such embodiments, it may be advantageous for the central riser in the upper vessel section to be made of reduced diameter as compared with the core basket or shroud 22, in order to enlarge the downcomer annulus 7 to permit a larger steam generator. In such embodiments, the coupling of the riser transition weldment 38 to the hollow cylindrical central riser 6 should be conical—but such conical narrowing reduces the diameter of the overhead opening through which the upper internals are accessible.

Figure 8:
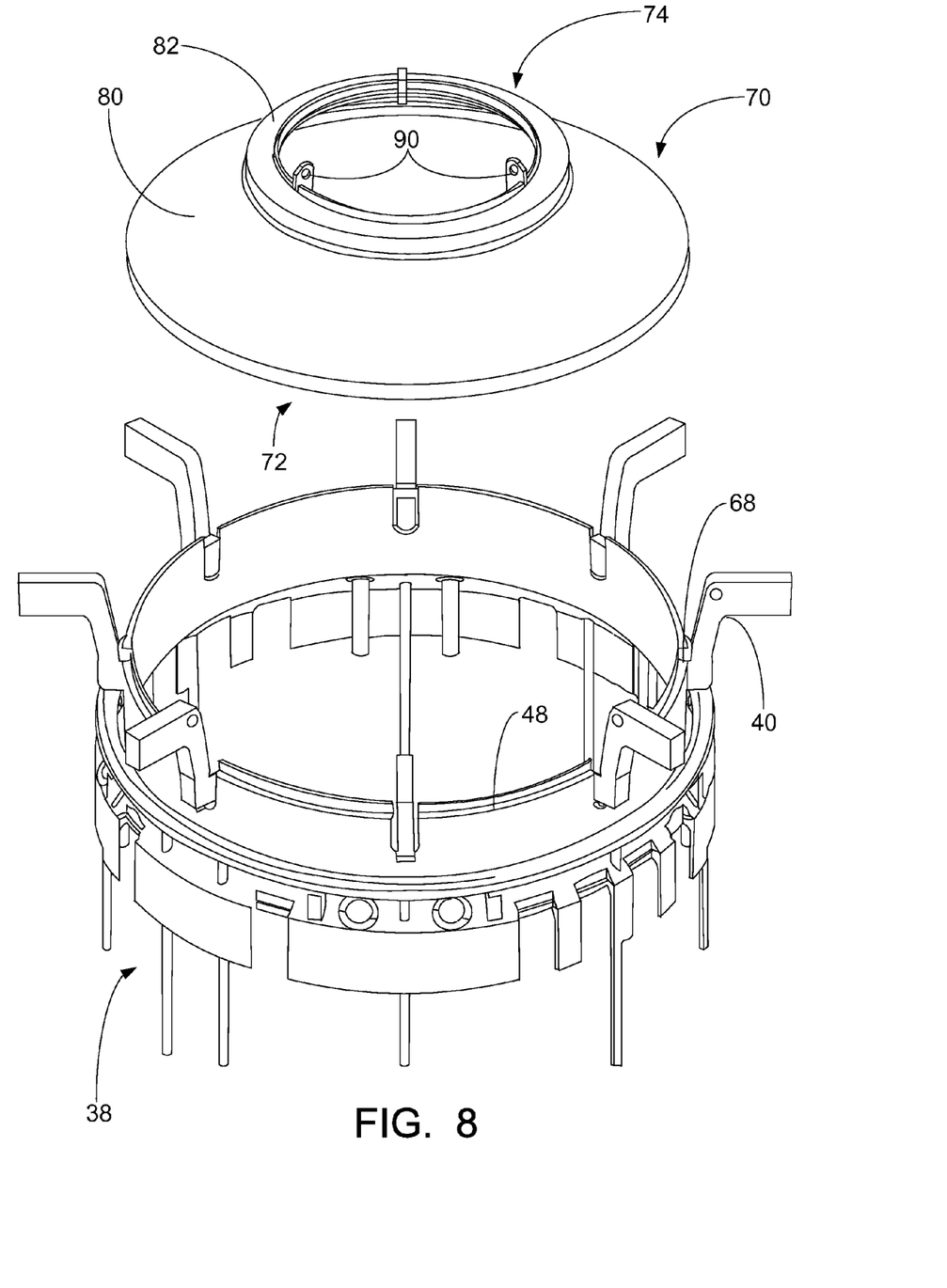
FIG. 8 shows an exploded isolation perspective view of a riser cone and the riser transition in which the riser cone is lifted off the riser transition weldment.

With reference to FIG. 8, in embodiments disclosed herein, these difficulties are overcome by use of a compliant riser cone 70 that is disposed between the bottom end of the central riser 6 and the riser transition weldment 38. FIG. 8 shows an exploded view in which the riser cone 70 is lifted away from the riser transition 38 (shown in isolation in FIG. 8). When the riser cone 70 is lowered onto the riser transition 38, the angle A of the tensile-strained portion 66 of the gussets 40 (see FIG. 7) provides lead-in for a riser cone 70. The end 62 of the gusset 40 that is welded to the riser transition 38 includes an upper ledge 68 that, along with the annular interface feature 48 of the riser transition weldment 38, serves as the interface receiving the (relatively) larger-diameter lower end 72 of the riser cone 70. The (relatively) smaller-diameter upper end 74 of the riser cone 70 engages the bottom of the central riser 6 (not shown in FIG. 8). The riser cone 70 is an element or assembly that provides a boundary between the hot and cold leg reactor coolant flow paths and directs reactor coolant flow between the upper vessel 4 and lower vessel 3.

Figure 9:
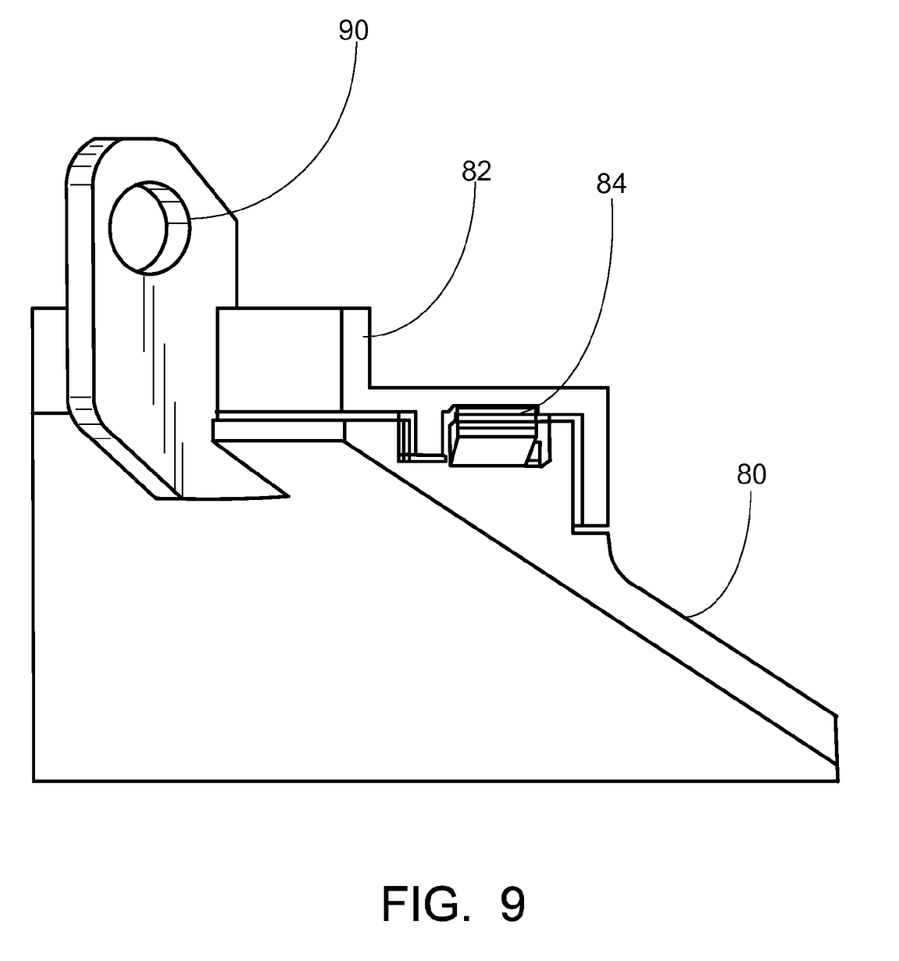
FIG. 9 shows an enlarged sectional view of a portion of the riser cone of FIG. 8 in its compressed state in which the upper portion of the riser transition of the lower vessel section compresses the riser cone against the lower portion of the riser in the installed upper vessel section.
Figure 10:
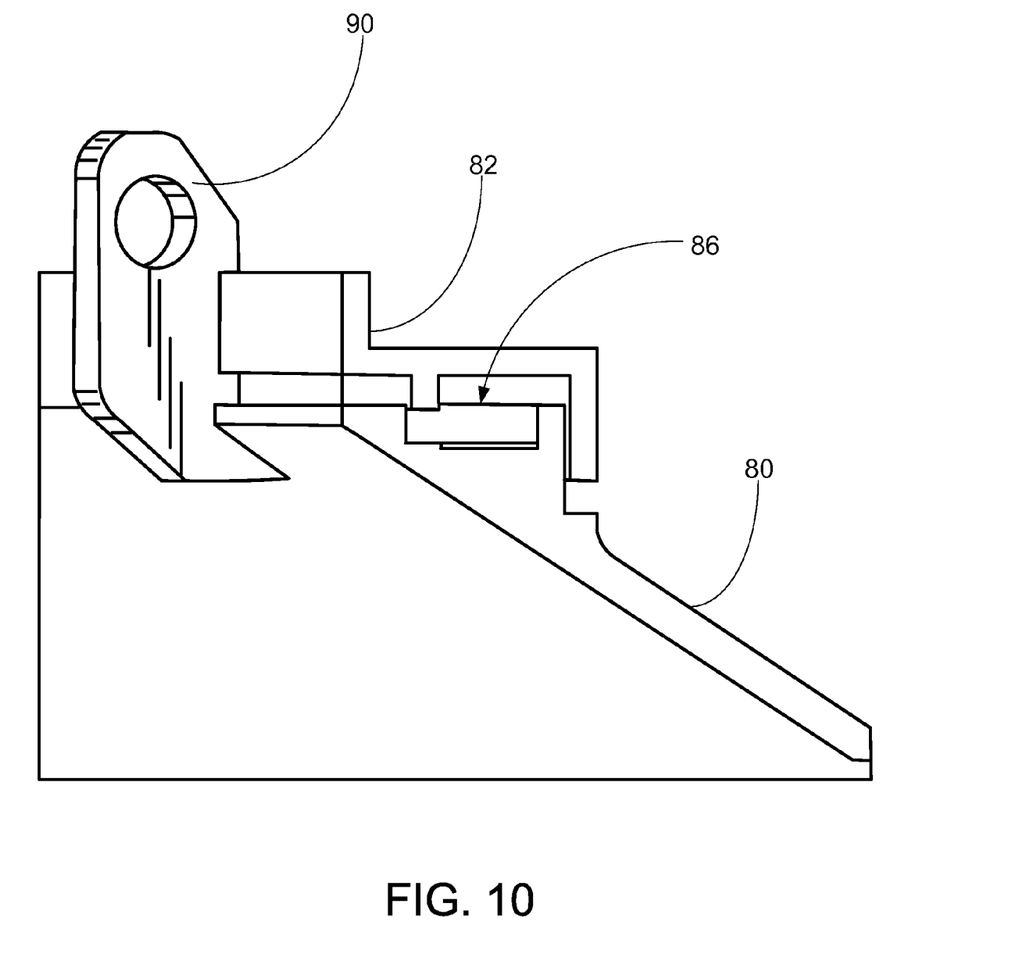
FIG. 10 shows an enlarged sectional view of the same portion of the riser cone as shown in FIG. 9, in its uncompressed state in which the upper vessel section is lifted off. The nested wave spring is not shown in FIG. 10.

The riser cone 70 is further described with continuing reference to FIG. 8 which shows the riser cone assembly 70 lifted off the riser transition 38, and with further reference to FIGS. 9 and 10 which show an enlarged sectional view of a portion of the riser cone 70 when compressed by the riser transition 6 and the installed upper vessel section 4 (FIG. 9) and in the uncompressed state with the upper vessel section 4 removed (FIG. 10). The riser cone 70 includes three major components: a riser cone body 80, a riser cone sealing ring 82, and a nested wave spring 84 (visible in FIG. 9; the spring 84 is omitted in FIG. 10 to illustrate the annular space 86 in which the spring is disposed).

Figure 11:
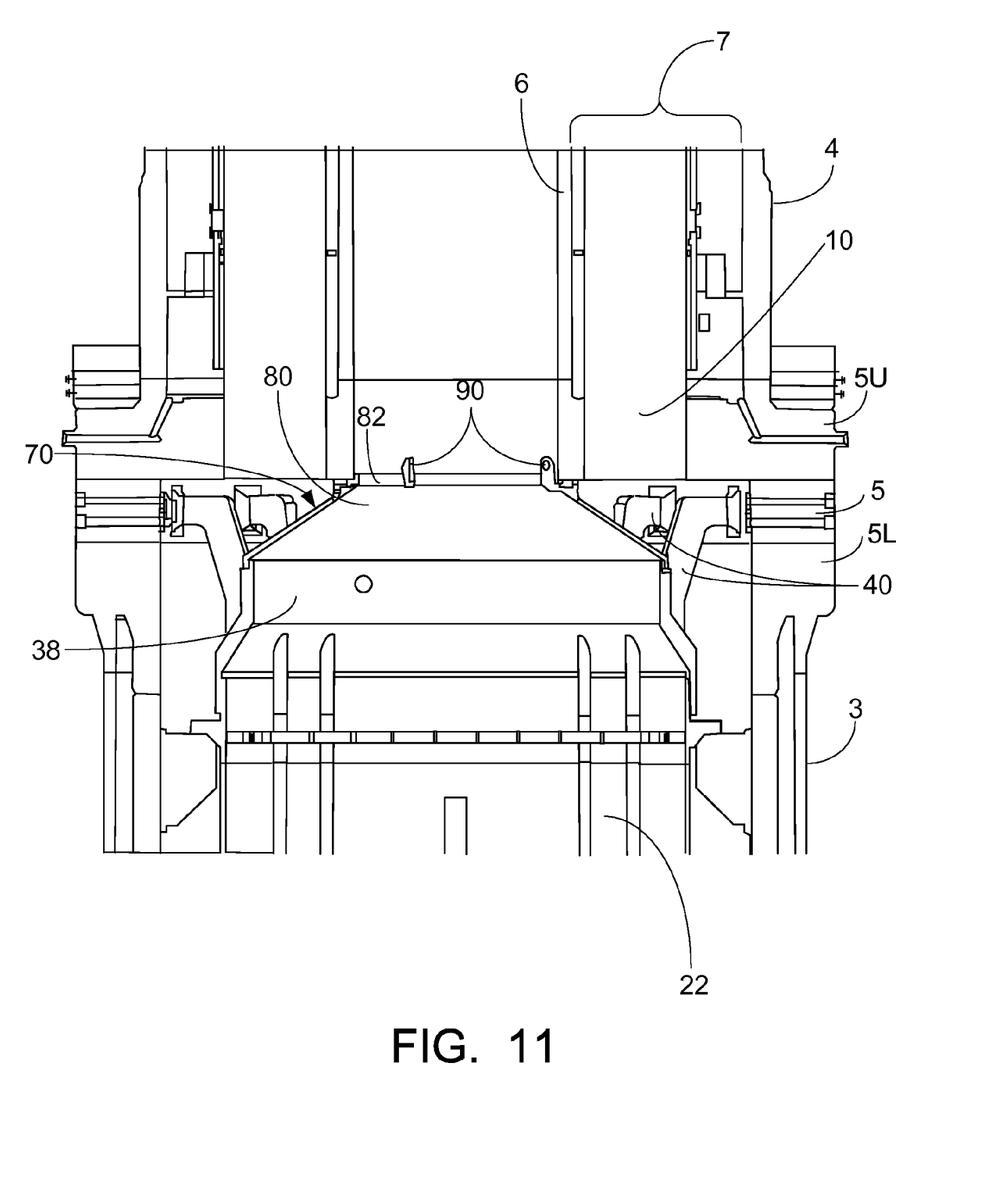
FIG. 11 shows a sectional view of the connection of the lower and upper vessel sections by the mid-flange, with the riser cone of FIG. 8 compressed between the central riser of the upper vessel section and the riser transition weldment.

With continuing reference to FIGS. 8-10 and with further reference to FIG. 11, the riser cone 70 is positioned between the upper vessel section 4 (and more particularly the central riser 6) and the riser transition weldment 38, as shown in the sectional view of FIG. 11. During operation, the distance between the upper vessel 4 and central riser 6 on the one hand, and riser transition 38 on the other hand, will change due to pressure loads and thermal expansion. To accommodate this behavior, the riser cone 70 contains a compliance feature, such as the illustrative sealing ring 82 and nested wave spring 84 engaging the cone body 80, which allows the riser cone 70 to extend and compress while maintaining separation between the reactor coolant hot leg and cold leg. The spring 84 acts to separate the riser cone sealing ring 82 from the riser cone body 80.

The illustrative riser cone 70 also incorporates features to enable timely installation and removal during reactor refueling, maintenance, and service operations. The illustrative riser cone 70 is not fastened to either the upper vessel component (e.g. central riser 6) or the lower vessel component (e.g. riser transition weldment 38). As a result, the installation and removal of the riser cone 70, and its ability to self-align, are enhanced. Optional lifting features, such as lugs 90 forged with or welded to the cone body 80 in the illustrative example, are provided so that the riser cone 70 may be raised and lowered using standard equipment available in the reactor containment building, such as a crane (not shown). The lifting features 90 optionally also serve as locators to center the riser cone 70 within the upper vessel riser (i.e., respective to the central riser 6, see FIG. 11) when the upper vessel 4 is mated to the lower vessel 3.

The compression of the sealing ring 82 and the cone body 80 provides a substantial seal against reactor coolant bypass flow through the riser cone 70; however, some bypass flow is contemplated and permissible. Reactor coolant bypass flow between the cold leg side (downward through the downcomer 7 and outside the core basket or shroud 22 in the illustrative embodiments) and the hot leg side of the riser cone (upward through the inside of the core basket or shroud 22 and the inside of the central riser 6 in the illustrative examples) is minimized by constructing the riser cone 70 to present a tortuous path for coolant bypass flow. The geometry of the illustrative riser cone 70 includes features which force the reactor coolant bypass flow through small channel fluid paths between the cold leg side and hot leg side. This increases the head losses through the riser cone bypass flow channels, and as a result, decreases the bypass flow rates.

Figure 12:
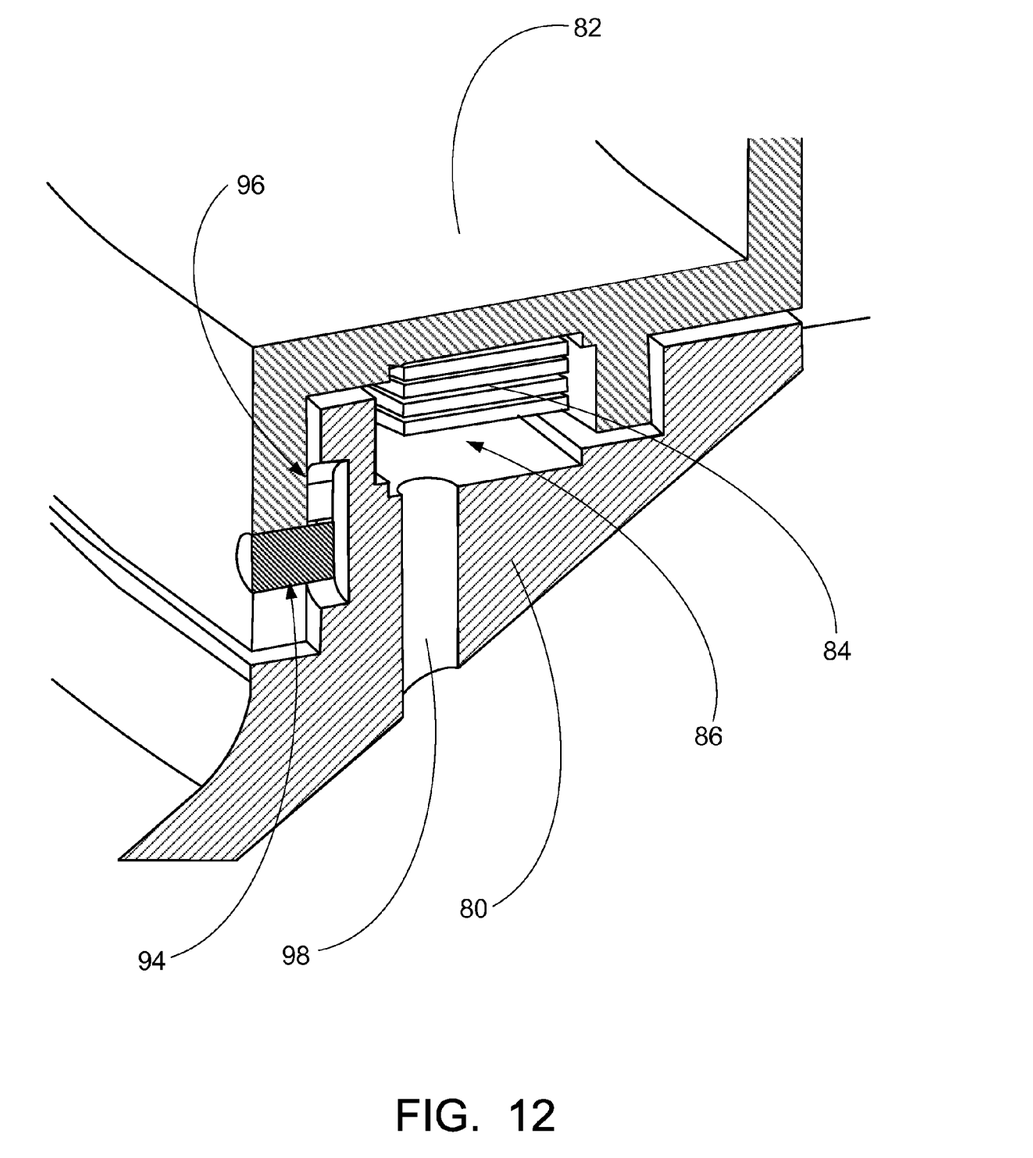
FIG. 12 shows an enlarged sectional view of a portion of the riser cone of FIG. 8 illustrating a pin-and-slot connection between the sealing ring and cone body components of the riser cone, and further showing a drain hole for the annular space containing the nested wave spring.

With reference to FIG. 12, the coupling of the sealing ring 82 to the cone body 80 comprises a pin and slot design to improve translation of the riser cone sealing ring 82 with respect to the riser cone body 80. This design also prevents the riser cone assembly 70 from separating into multiple pieces (i.e. retains the sealing ring 82 and wave spring 84 on the cone body 80) and limits the overall travel to a designated amount. As seen in FIG. 12, a pin 94 passes through the side of the sealing ring 82 and engages a slot 96 in the side of the cone body 80. (One such pin/slot pair is shown in the detail view of FIG. 12, but several such features are distributed around the circumference of the sealing ring 82). The vertical travel (or translation) of the sealing ring 82 respective to the cone body 80 is thus limited to the height of the slot 96 (minus the diameter of the shaft of the pin 94, which is typically relatively small). Another feature shown in FIG. 12 is a drain hole 98, one or more of which are provided to enable primary coolant to enter or exit the annular space 96 containing the nested wave spring 84 as the sealing ring 82 moves up or down respective to the cone body 80.

An advantage of the illustrative riser cone 70 is the ability to provide a transition between the reactor coolant flow areas of the upper vessel assembly and the corresponding flow areas of the lower vessel assembly while maintaining a physical boundary between the reactor coolant in the hot leg and cold leg sides. In an integral PWR such as those shown in FIGS. 1-3, the riser cone 70 is advantageously easily installed and removed to facilitate refueling and maintenance procedures. To address this issue, the riser cone 70 is not fastened between any neighboring components (e.g., the central riser 6 or the core basket or shroud 22). As seen in FIG. 11, the geometry of the cone (or, more precisely, frustum of a cone) of the cone body 80 is chosen to accommodate any narrowed diameter of the central riser 6 as compared with the core basket or shroud 22. At the same time, as seen in FIG. 8, once the riser cone 70 is removed, the overhead opening for accessing the upper internals is the large diameter of the riser transition weldment 38, which is close to the diameter of the core basket or shroud 22. An additional advantage of the riser cone 70 is its ability to self-align between the interfacing components 6, 22 as the upper vessel assembly is mated to the lower vessel assembly.

The illustrative riser cone 70 serves as a compression sealing ring for sealing the connection of the upper cylindrical riser 6 in the upper vessel section 4 with the core basket or shroud 22 of the lower vessel section 3. The riser cone 70 has a frustoconical shape to accommodate the narrowed central riser 6 as compared with the larger-diameter core basket or shroud 22, although some variation from a mathematical frustoconical structure is contemplated.

Various alternative or variant embodiments are contemplated. Some alternative embodiments of the riser cone include the following. The riser cone may be a single part rather than an assembly. The compliance feature (that is, the ability to expand and contract with neighboring components) may utilize any type of spring or no spring. The interfacing components may be different than those of the illustrated embodiment. Fasteners between the riser cone and neighboring components may be included. The lifting and alignment features may be relocated, replaced by alternative geometry, or omitted entirely. Baffles or other features may be included to further reduce bypass flow. The fluid around the riser cone may flow in different directions than those of the illustrative PWR embodiments. The drain holes may be located elsewhere and/or may assume alternate geometry. The pin and slot features 94, 96 may be replaced by alternate designs including but not limited to axial (vertical direction) rather than radial arrangement. The riser cone may include one, more, all, or none of the foregoing variations, or other variations.

Figure 13:
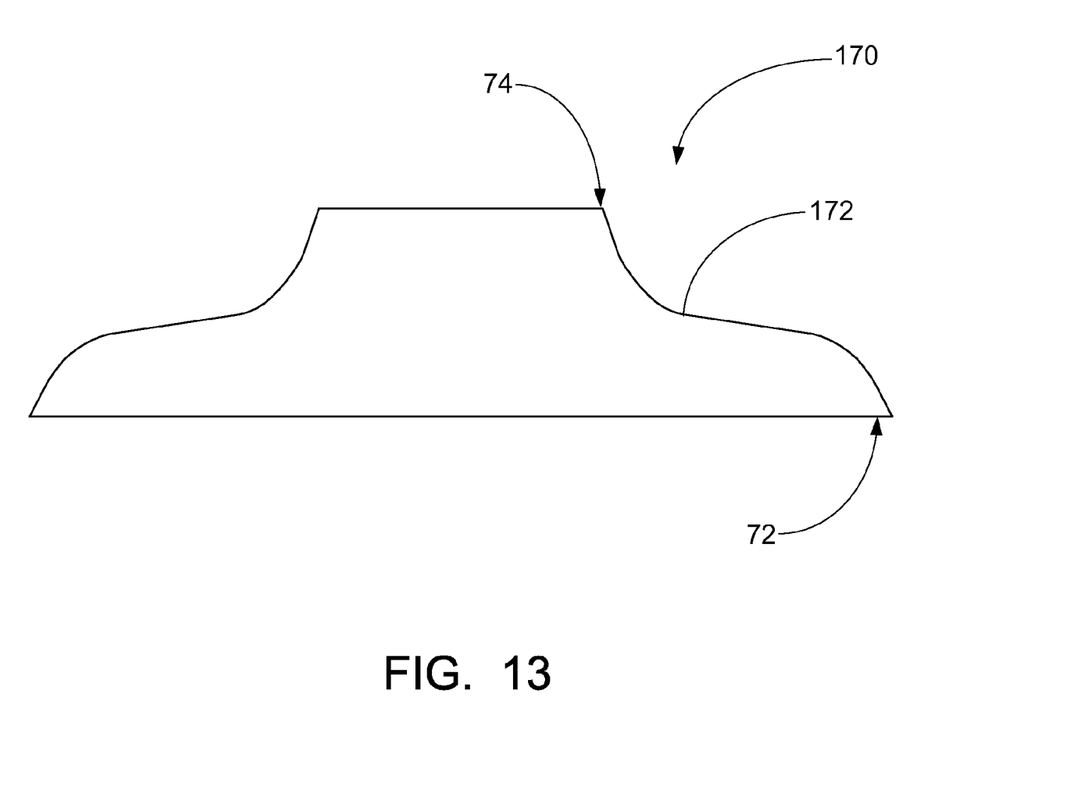
FIG. 13 diagrammatically shows a side view of an alternative, single-piece riser cone embodiment.

With reference to FIG. 13, in another contemplated variant embodiment, the two-piece riser cone 70 with springs 84 for compliance is replaced by a single-piece riser cone 170 having lower and upper ends 72, 74 corresponding to these ends of the riser cone 70, in which the shape of the single-piece riser cone 170 includes a deformable portion 172 to provide compliance. The design of FIG. 13 is expected to exhibit additional pressure drop as compared with the embodiment of FIGS. 8-12.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A nuclear reactor comprising:
a cylindrical pressure vessel including an upper vessel section and a lower vessel section;
a nuclear reactor core comprising fissile material disposed in the cylindrical pressure vessel immersed in primary coolant water;
a cylindrical central riser disposed in the cylindrical pressure vessel above the nuclear reactor core, the cylindrical central riser including an upper riser section disposed in the upper pressure vessel section and a lower riser section disposed in the lower pressure vessel section, the upper riser section having a smaller diameter than the lower riser section; and
a riser cone including a frustoconical body having a lower end engaging the lower riser section, a sealing ring engaging the upper riser section, and a spring compressed between the sealing ring and an upper end of the frustoconical body.

2. The nuclear reactor of claim 1 wherein the lower riser section includes one of a core basket and a shroud surrounding the nuclear reactor core.

3. The nuclear reactor of claim 2 wherein the lower riser section further comprises a riser transition weldment disposed on the one of a core basket and a shroud, the riser transition weldment including interface features engaging a lower end of the riser cone.

4. The nuclear reactor of claim 1 wherein the spring is a nested wave spring.

5. The nuclear reactor of claim 1 wherein the riser cone includes a flow path for reactor coolant bypass flow.

* * * * *